United States Patent [19]

Kerfoot et al.

[11] Patent Number: 5,344,479
[45] Date of Patent: Sep. 6, 1994

[54] UPGRADING COPPER SULPHIDE RESIDUES CONTAINING NICKEL AND ARSENIC

[75] Inventors: Derek G. E. Kerfoot; Rein Raudsepp, both of St. Albert, Canada

[73] Assignee: Sherritt Gordon Limited, Edmonton, Canada

[21] Appl. No.: 29,513

[22] Filed: Mar. 11, 1993

[30] Foreign Application Priority Data

Mar. 13, 1992 [CA] Canada ............................... 2063031-1

[51] Int. Cl.$^5$ .............................................. C22B 3/44
[52] U.S. Cl. ...................................... 75/743; 75/429; 423/27; 423/150.3; 423/150.4; 423/150.5; 423/150.6; 423/594; 423/602
[58] Field of Search ..................... 75/743, 429; 423/27, 423/150.4, 150.3, 150.5, 150.6, 594, 602

[56] References Cited

U.S. PATENT DOCUMENTS 4,571,262  2/1986  Kerfoot et al. ...................... 423/41

Primary Examiner—Melvyn J. Andrews
Attorney, Agent, or Firm—Arne I. Fors; Jeffrey T. Imai; Doak Horne

[57] ABSTRACT

A process is disclosed for separating and recovering nickel and copper values from a nickel-copper matte which may contain iron and arsenic. Finely divided nickel-copper matte is leached in aqueous sulphuric acid solution under oxidizing conditions at atmospheric pressure and at a minimum temperature of about 80° C. to selectively leach nickel from the matte to produce a nickel sulphate solution having a final pH in the range of about 4.0 to 6.5, preferably about 6.5, and to produce a copper-rich sulphide residue. The copper-rich sulphide residue is separated from the nickel sulphate solution and leached in a closed reaction vessel at a minimum temperature of about 120° C. under a non-oxidizing atmosphere in a sulphuric acid solution containing an effective amount of copper and sulphuric acid to provide a terminal concentration of at least about 2 g/L $Cu^{2+}$ and at least about 20 g/L sulphuric acid to produce a nickel sulphate solution containing any iron and arsenic and to produce a low nickel copper sulphide product essentially free of iron and arsenic.

10 Claims, 1 Drawing Sheet

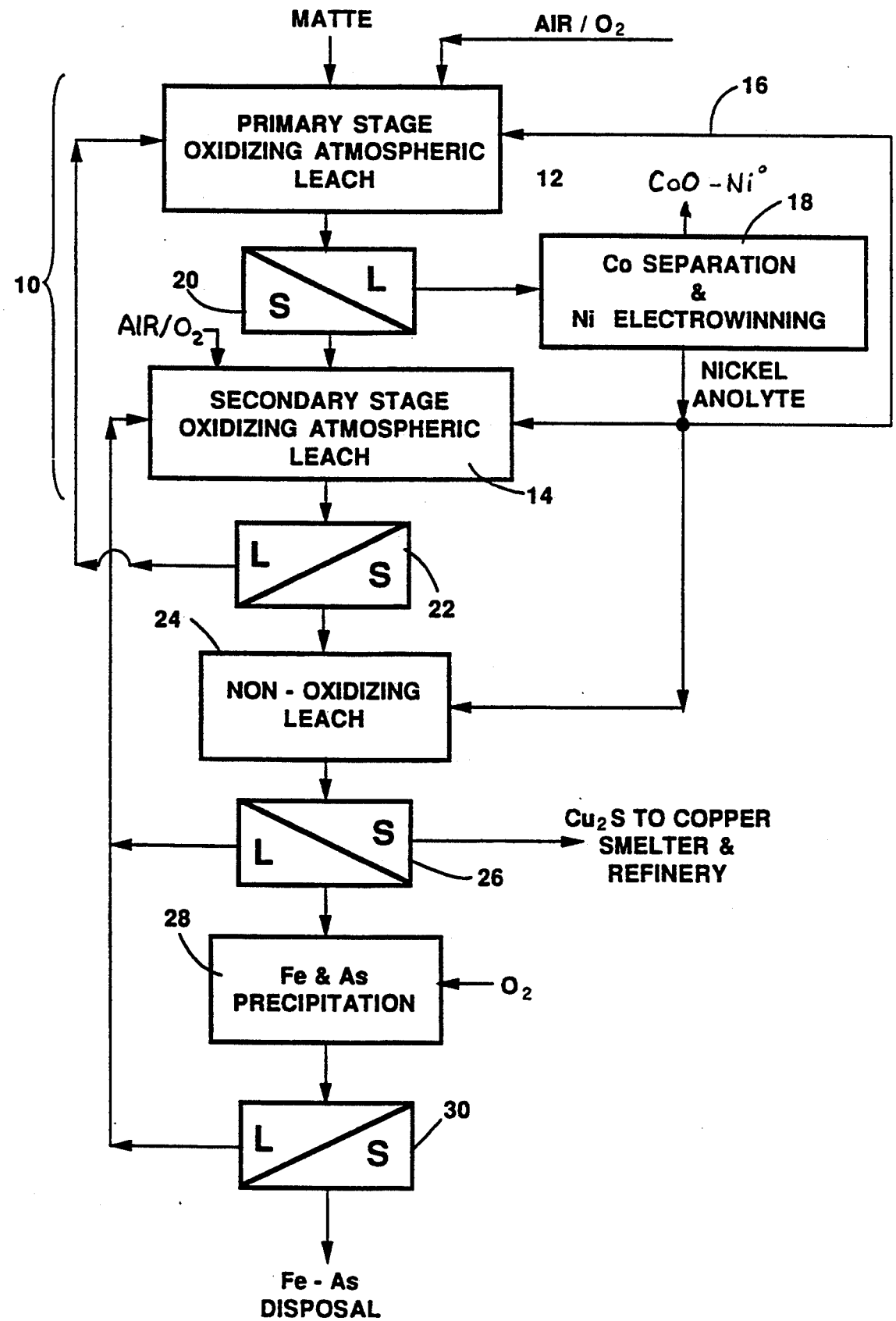

UPGRADING COPPER SULPHIDE RESIDUES CONTAINING NICKEL AND ARSENIC

BACKGROUND OF THE INVENTION

1. Field of the Invention

This invention relates to a process for treating nickel-copper mattes for the recovery of copper and nickel values. More particularly, this invention pertains to a process for treating arsenic-containing nickel-copper matte to produce an essentially copper-free solution of nickel sulphate, from which metallic nickel can be recovered by electrowinning, and a copper sulphide concentrate containing low levels of both nickel and arsenic, from which copper can be recovered by smelting and refining.

2. Background of the Invention

Copper sulphide concentrates should contain less than about 1% Ni and less than about 1% As to be suitable for treatment in a conventional copper smelter to produce anode copper for electrorefining. Nickel-copper matte, from which low a nickel- and arsenic-content copper sulphide concentrate is to be produced, typically contains 65 to 70% Ni, 20 to 25% Cu, 2% As and 6% S. Currently this material is treated in two stages of atmospheric acid leaching at 80° C. to produce a copper free nickel sulphate solution, and a copper rich residue. The nickel sulphate solution forms the feed to conventional cobalt removal and nickel electrowinning circuits, where the cobalt and nickel are recovered as cobaltic oxide and cathode nickel, respectively. The copper-rich residue typically contains 45 to 55% Cu, 10 to 15% Ni, 2 to 4% As, and 17 to 20% S. Since the nickel and arsenic contents are much too high for treatment of the copper sulphide directly in a copper smelter, the residue is recycled to the nickel smelter which produces the nickel copper matte.

A principal object of this invention is to provide a process for producing a copper sulphide residue containing low levels of nickel and from an arsenic containing nickel-copper matte. More particularly, an object of this invention is to treat a copper rich residue to reduce the nickel and arsenic contents to less than 1%, thus avoiding the need to recycle the residue to the nickel smelter, which is costly, and which increases metal losses to slag. Direct treatment of the copper sulphide in a copper smelter potentially offers increased metal recoveries, reduced costs, and also permits the separate recovery of precious and platinum group metals in a concentrated form.

Prior art leach processes are disclosed in U.S. Pat. No. 4,323,541 granted Apr. 6, 1982 to Outokumpu Oy and U.S. Pat. No. 3,616,331 granted Oct. 26, 1971 to International Nickel Company Inc.

U.S. Pat. No. 4,323,541 discloses leaching a finely-ground nickel-copper matte using an acid solution at a minimum temperature of approximately 80° C. and under oxidizing conditions in order to produce a nickel sulphate solution and a nickel-copper sulphide residue, which is separated from the solution. Thereafter the nickel-copper sulphide residue is leached using acid in an autoclave at a minimum temperature of 110° C. and under oxidizing conditions in order to produce an additional quantity of nickel sulphate solution and a copper sulphide precipitate.

U.S. Pat. No. 3,616,331 shows a two-stage process for the treatment of a nickel-containing copper sulphide material which contains copper and sulphur in ratios of at least 3.5:1, preferably between 4:1 and 10:1, and controlled amounts of iron. This material is leached with an acidic aqueous solution containing copper sulphate in amounts at least stoichiometrically equivalent to the nickel, iron and cobalt contained in the starting material, and sufficient sulphuric acid to maintain a pH below 5- Advantageously, the copper sulphate solution contains a stoichiometric excess of copper sulphate of up to about 20% in order to ensure maximum dissolution of the nickel, iron and cobalt as sulphates. The leaching operation is conducted at a temperature between about 100° C. and 250° C. under the pressure generated at these temperatures. The residue obtained from this leaching operation contains substantially all the copper in the starting material as copper sulphide and cement copper and is substantially free of iron. After filtration, the filtrate is treated to recover nickel, and the residue is treated to recover copper and sulphur in a second pressure leaching step.

Each of the processes described in these prior art patents was tested on a copper rich residue produced in a conventional two-stage atmosphere acid leaching process. The process of U. S. Pat. No. 4,323,541 was tested in a batch leach at 150° C. under an air pressure of 150 kPa, using a solution containing 33 g/L $H_2SO_4$ and 3 g/L Cu. After a 2 hour leach the final residue containing 59% Cu, 2.3% Ni, 4.5% As and 21% S. Both nickel and arsenic contents were too high for direct feed to a copper smelter.

The first step of the two-stage process disclosed in U.S. Pat. No. 3,616,331 was tested on a similar residue using a leach solution containing 50 to 80 g/L Cu and 3 to 5 g/L. $H_2SO_4$ in leach tests at 150° and 200° C. The copper sulphide residue contained 7.9% Ni after a 60 minute leach at 150° C., and 1.6% after a 60 minute leach at 200° C. Even at 200° C. therefore this process did not give the required low level of nickel in the copper sulphide residue, and very little nickel extraction occurred at 150° C.

Neither of the above processes described was satisfactory for treating the specified copper sulphide residue to give a product with sufficiently low nickel and arsenic concentrations for direct smelting to anode copper.

SUMMARY OF THE INVENTION

It has been discovered that much of the unleached nickel in the copper sulphide residue, after treatment by the prior art processes, was in the form of a refractory nickel oxide, NiO. This oxide can only be leached effectively, even at elevated temperatures, by maintaining higher concentrations of sulphuric acid in the leach solution than are provided in the prior art processes.

It has also been found that while arsenic is converted into insoluble ferric arsenate under the oxidizing conditions of the pressure leach described in U.S. Pat. No. 4,323,541, and thus remains in the copper sulphide residue, it can also be reprecipitated from solution as an insoluble sulphide, enargite, $Cu_3AsS_4$, under the non-oxidizing conditions. Surprisingly, we have discovered that the provision of increased levels of soluble copper in the leach solution not only prevents the precipitation of arsenic as enargite, but can also increase the extraction of nickel from the copper sulphide residue. The amount of soluble copper provided must be sufficient to yield a copper sulphide residue with a Cu:S mass ratio of at least 3:1, and preferably about 4:1, to maximize nickel extraction, while providing at least 2 g/L residual Cu in the leach solutions to maximize arsenic extraction.

The nickel-copper matte treatment flowsheet of the present invention therefore is designed with the object of providing the required amounts of sulphuric acid and soluble copper in the feed solution to a third stage non-oxidizing pressure leach to achieve maximum extraction of nickel and arsenic from the copper sulphide residue.

In its broad aspect, the process of the present invention is directed to the leaching of granular nickel-copper matte in an acidic solution under oxidizing conditions at atmospheric pressure with a deficiency of acid to produce a copper-free nickel sulphate solution and a copper-rich sulphide residue containing a controlled amount of readily- acid-soluble copper, followed by the leaching of the copper-rich sulphide residue in an acidic solution under non-oxidizing conditions under elevated temperature and pressure to produce a final nickel sulphate solution containing a predetermined minimum of soluble copper and an excess of acid to maintain any iron and arsenic in solution while producing a low nickel copper sulphide product essentially free of iron and arsenic.

We have found that conducting the atmospheric acid leaching of the copper-nickel matte under oxidizing conditions with a deficiency of acid in both stages of the two-stage leach results in the hydrolysis of metal sulphates, principally copper sulphate, with precipitation of the basic copper sulphate antlerite. The basic copper sulphate is readily soluble in acid solution under the non-oxidizing conditions of a pressure leach with an excess of acid, and thus provides an effective source of soluble copper required to displace nickel and arsenic from the copper sulphide residue in the pressure leach, to produce a copper sulphide residue essentially free of iron and low in arsenic and nickel content.

More particularly, the process of the present invention is directed to the leaching of granular nickel-copper matte in an acidic solution under oxidizing conditions at a temperature of about 80° C. under atmospheric pressure to produce a nickel sulphate solution and a copper-rich sulphide residue, followed by leaching of the copper-rich sulphide residue in an acidic solution containing an effective amount of copper and sulphuric acid to provide terminal concentrations of at least 2 g/L $Cu^{2+}$ and at least 20 g/L sulphuric acid in a nickel sulphate solution containing any arsenic and iron in the copper-rich sulphide residue from the oxidizing leach and to produce a final copper sulphide residue product essentially free of arsenic and iron and with a low nickel content. These terminal concentrations are provided by ensuring at least a 3:1 copper to sulphur mass ratio, preferably in the range of 3:1 to 4:1 copper to sulphur mass ratio, in the copper sulphide residue product from the non-oxidizing leach. The oxidizing acid leach of the matte under atmospheric pressure with a deficiency of acid preferably is carried out in two stages; a primary leach stage with an excess of matte feed whereby up to about 50% of the nickel is dissolved and essentially all the copper is precipitated as metallic copper, copper sulphide and basic copper sulphate, and a secondary leach stage with a controlled amount of acid whereby most of the remaining nickel and a portion of the copper are dissolved and a predetermined effective amount of copper sulphate is hydrolyzed and precipitated as basic copper sulphate. A final pH in the range of 4.0 to 6.5, preferably about 6.5 in the first stage solution and about 4.5 in the second stage solution ensures adequate basic copper sulphate as a source of soluble copper for the subsequent non-oxidizing acid leach.

BRIEF DESCRIPTION OF THE DRAWING

The process of the invention will be described with reference to the drawing which is a schematic flowsheet illustrating a preferred embodiment thereof.

DESCRIPTION OF THE PREFERRED EMBODIMENT

With reference to the drawing, numeral 10 depicts the oxidizing atmospheric leach of the process of the invention which preferably comprises a primary stage oxidizing leach 12 and a secondary stage oxidizing leach 14. Matte ground to a particle size of less than about 20 microns and having a typical composition by weight of 68% Ni, 23% Cu, 2% As and 6% S, with a Cu:S ratio in the range of 2:1 to 4:1, usually in the range of about 3:1 to 4:1, is fed to primary stage oxidizing leach 12 for reaction in an aqueous sulphuric acid solution, preferably recycle leach solution from secondary stage oxidizing leach 14. The solution is maintained at a temperature in the range of about 80° C. to the boiling point of the solution, preferably at about 80° C. Air and/or oxygen is sparged into the solution which is under atmospheric pressure and the solution agitated for extraction of about 45–50% of the nickel without oxidizing the sulphur. An excess of matte is provided relative to the acid to ensure precipitation of the copper as metallic copper, copper sulphide, and basic copper sulphate. The residue may also contain copper oxide, $Cu_2O$ formed by oxidation of metallic copper as well as any unreacted metallic nickel $Ni_3S_2$ and NiO. A final pH in the range of 4.0 to 6.5, preferably about 6.5, is attained.

The leach solution with up to 90 g/L Ni and containing 5 to 10 mg/L of each of copper and iron is passed to cobalt separation and nickel electrowinning 18. Nickel anolyte solution, typically containing 50 g/L Ni and 50 g/L $H_2SO_4$, is returned as lixiviant to the leaching circuits.

The nickel-copper sulphate residue is separated from the leach solution in liquid-solid separator 20 and passed to secondary stage oxidizing leach 14 under similar temperature and pressure conditions as those in the primary stage leach 12 and reacted with a controlled amount of sulphuric acid-containing nickel sulphate solution comprised of 50 g/L Ni and 50 g/L $H_2SO_4$ at a sulphuric acid to solids mass ratio in the range of 0.3:1 to 0.6:1, preferably about 0.5:1. The quantity of acid thus is controlled to provide an acid deficiency at termination of the leach represented by a pH in the range of 4.0 to 6.5, preferably about 4.5, to leach most of the remaining nickel and to produce a leach residue of which about 60% by weight is in a readily acid soluble form such as basic copper and nickel sulphates and ferric arsenate. The acid balance in the circuit is maintained by diverting that portion of the available nickel anolyte which is not used in the secondary oxidizing leach 14 or the non-oxidizing pressure leach 24, directly to the primary leach 12.

The leach solution containing about 70–80 g/L and 10 g/L Cu at a pH of about 4.5 is recycled to primary stage oxidizing leach 12. The copper-rich sulphide residue comprised of copper and nickel sulphides and nickel oxide, together with the acid soluble basic copper sulphate ($CuSO_4.2Cu(OH)_2$), basic nickel sulphate and ferric arsenate, is separated from the leach solution by liquid-solid separator 22 and fed to an autoclave for a non-oxidizing leach 24 with a sulphuric acid containing nickel sulphate solution having about 50 g/L Ni and 50 g/L $H_2S_4O$ at an acid to solids mass ratio in the range of 0.3:1 to 0.8:1, preferably about 0.5:1 to 0.7:1. The non-oxidizing atmosphere of this leach is maintained by sparging steam or steam containing nitrogen into the autoclave to maintain the solution temperature at above 120° C., preferably in the range of 140° to 160° C. The basic metal sulphate precipitate and the ferric arsenate are redissolved in the acid solution under the non-oxidizing conditions and the Ni, Fe and As are maintained in solution due to the presence of soluble copper from the basic copper sulphate. The copper sulphide residue having low nickel, arsenic and iron contents is separated from the leach solution by liquid-solid separator 26 and can be treated by conventional copper smelting and refining.

The leach solution can be recycled to secondary stage oxidizing leach 14 or treated in iron-arsenic precipitation step 28 in which the solution is heated to about 150° C. under oxidizing conditions for precipitation of the iron and arsenic as ferric arsenate. The ferric arsenate precipitate is separated from the leach solution by liquid-solid separator 30 for disposal and the solution is recycled to secondary oxidizing leach 14.

The process of the invention will now be described with reference to the following non-limitative examples:

EXAMPLE 1

The same nickel oxide-containing copper sulphide residue containing 55.8% Cu, 12.8% Ni and 19.7% S discussed above in connection with the test of the process of U.S. Pat. No. 3,616,331, was contacted with a solution containing 50 g/L Cu and 50 g/L $H_2S_4O$ at 150° C. for 120 minutes under non-oxidizing conditions. Samples of residue were taken for analysis after 60 and 120 minutes of leaching. After 60 minutes, the leach residue contained 72.4% Cu, 2.5% Ni and 22.3% S, and after 120 minutes it analyzed 75% Cu, 0.9% Ni and 21.3% S. This example demonstrates that by increasing the acid concentration from less than 15 g/L $H_2S_4O$ to 50 g/L in the leach solution, nickel oxide and nickel sulphide can be leached from the copper sulphide residue at a much lower temperature (150° C.) than is required using the U.S. Pat. No. 3,616,331 process conditions (200° C.). This will obviously require much less energy and the milder conditions of temperature and pressure will permit the use of less expensive materials of construction.

EXAMPLE 2

The nickel oxide-containing copper sulphide residue containing 45.5% Cu, 13.7% Ni and 2.6% As, 2.5% Fe and 17.6% S, which was discussed above in connection with U.S. Pat. No. 4,323,541 was leached in a solution containing 3 g/L Cu and 33 g/L $H_2S_4O$ in a 2.5 L autoclave for 180 minutes in a substantially oxygen free atmosphere. Samples of residue were taken for analysis after 120 and 180 minutes. After 120 minutes the residue contained 73.4% Cu, 0.52% Ni, 0.15% Fe, 0.67% As and 21.5% S. After 180 minutes the residue analyzed 74.3% Cu, 0.3% Ni, 0.10% Fe, 0.5% As and 21.6% S. The leach solution contained 10 g/L Ni, 0.5 g/L Cu and 22 g/L $H_2S_4O$. The Cu:Ni and Cu:As ratios in the final residue were 247:1 and 149:1 respectively. The Ni:Cu ratio in the solution was 20:1.

This example demonstrates that the process of the present invention is more effective in removing the impurity elements Ni, Fe and As than prior art oxidizing leaches. The residue produced by the oxidizing leach disclosed in U.S. Pat. No. 4,323,541 contained 9.8% Ni+Fe+As, whereas the residue from the process of the present invention contained only 0.9% Ni+Fe+As.

EXAMPLE 3

This example illustrates a preferred embodiment of the process in which a nickel-copper matte containing 68% Ni, 23% Cu, 6% S, 0.9% As, 0.6% Co and 0-6% Fe was leached at 80° C. in the first stage of a commercial two-stage atmospheric oxidizing leach process in a solution containing 7 g/L Cu, 1.1 g/L Fe, 50 g/L Ni and 14 g/L $H_2S_4O$ in an air sparged reactor. The resulting leach liquor, which formed the feed to cobalt and nickel separation and recovery circuits, contained 80 g/L Ni, 0.4 g/L Co, with less than 10 mg/L each of Cu and Fe, at pH 6.5. Approximately 40% of the nickel content of the matte was extracted into the solution. The leach residue analyzed 30% Cu, 31% Ni, 2.4% Fe, 0.7% As and 9.4% S. Over 55% of this residue consisted of readily acid-soluble compounds such as basic copper and nickel sulphates and ferric arsenate. The balance consisted of cuprous sulphide, $Cu_2S$, cuprous oxide, $Cu_2O$, metallic nickel, nickel sulphides (mainly $Ni_3S_2$) and nickel oxide, NiO.

The residue from this first stage oxidizing leach was reacted in a second stage atmospheric oxidizing leach at 80° C. with a controlled amount of sulphuric acid-containing nickel sulphate solution (50 g/L Ni+50 g/L $H_2S_4O$) at a sulphuric acid to solids mass ratio of 0.48:1, in an air sparged reactor, for one hour. The resulting leach liquor contained 75 g/L Ni and 9 g/L Cu at pH 4.6. The leach residue contained 38% Cu, 15% Ni, 1.5% As, 3.5% Fe and 12.6% S. About 60% of this residue consisted of readily acid soluble components such as basic copper and nickel sulphates and ferric arsenate. The balance consisted of cuprous sulphides, $Cu_2S$ and $Cu_9S_5$, nickel sulphides, $Ni_3S_2$ and NiS, and nickel oxide, NiO.

The residue from the second stage atmospheric oxidizing leach was repulped in sulphuric acid-containing nickel sulphate solution (50 g/L Ni+50 g/L $H_2SO_4$) at an acid to solids mass ratio of 0.69:1, and leached in an autoclave at 150° C. in non-oxidizing conditions, under steam pressure only, for four hours. After the initial repulping of the residue in acid solution, the solution contained 9 g/L Cu, 54 g/L Ni and 32 g/L $H_2SO_4$, while the residue analyzed 49% Cu, 21% S, 22.7% Ni, 0.8% Fe and 0.47% As. After the four hour pressure leach, the solution contained 5 g/L Cu, 60 g/L Ni and 34 g/L $H_2S_4O$ while the residue analyzed 75% Cu, 20% S, 0.1% Ni, 0.01% Fe and 0.23% As, and consisted essentially of digenite, $Cu_9S_5$. The copper to sulphur ratio in the copper sulphide was 3.75:1.

EXAMPLE 4

This example illustrates the effect of soluble copper on Ni+As extraction in the non-oxidizing pressure leach.

A series of four batch pressure leach tests was carried out on second stage oxidizing leach residue from a commercial circuit to illustrate the effect of different levels of dissolved copper in the leach solution on the behaviour of nickel and arsenic. Each test was conducted at 150° C. for 3 hours in a non-oxidizing leach under steam pressure only. The solids to liquid ratio in the autoclave charge was 72 g/L. The feed solids had a composition of 44.4% Cu, 17.9% Ni, 2.2% As, and 20.4% S. The Cu to sulphur ratio in the feed solids was 2.18:1, and only 14% of the solids and 5% of the copper were readily soluble in the acid solution. The results of these tests are summarized in the Table I below:

TABLE 1

| Feed Solution, g/L | Cu | 3 | 5 | 10 | 20 |
|---|---|---|---|---|---|
|  | $H_2SO_4$ | 40 | 40 | 40 | 40 |
| Leach liquor, g/L | As | 0.48 | 1.06 | 1.68 | 1.65 |
|  | Cu | <0.005 | 0.01 | 0.8 | 7.5 |
|  | $H_2SO_4$ | 27 | 26 | 33 | 38 |
| Leach Residue, % | As | 1.82 | 1.24 | 0.20 | 0.22 |
|  | Cu | 60.6 | 67.0 | 71.7 | 73.1 |
|  | Ni | 1.29 | 0.9 | 0.3 | 0.2 |
|  | S | 26.0 | 24.9 | 23.0 | 21.7 |
| Residue Cu:S Ratio (by mass) |  | 2.33 | 2.69 | 3.12 | 3.37 |

These tests show the importance of providing sufficient dissolved copper in the feed solution to the non-oxidizing leach. With solutions containing less than 10 g/L Cu, the leach residue contained 1 to 2% Ni and As, whereas with 10 to 20 g/L Cu in the feed solution, the residue contained 0.2 to 0.3% Ni and As. The behaviour of the arsenic and nickel is apparently determined by the copper to sulphur ratio in the copper sulphide residue produced in the pressure leach. Sufficient soluble copper must be provided in the feed solution to produce a residue with a Cu:S mass ratio in the range 3:1 to 4:1, while still leaving about 2 g/L Cu in the leach solution. The quantity of soluble copper required will range from 0.05 kg $Cu^{2+}$/kg of feed solids for feed material with a Cu:S ratio in the range 3:1 to 4:1, to 0.20 kg $Cu^{2+}$/kg of feed solids for feed material with a Cu:S ratio of 2:1.

EXAMPLE 5

This example illustrates a continuous operation of the non-oxidizing pressure leach. A continuous leaching test on the non-oxidizing pressure leach was carried out on a sample of two-stage leach residue from a commercial circuit, analyzing 44.4% Cu, 17.9% Ni, 2.2% As and 20.4% S, using a six compartment horizontal autoclave. Leaching was carried out at 150° C., under steam pressure only, with a retention time of six hours, for a period of 96 hours. Typical results are presented in the Table 2 below:

TABLE 2

| Solids:Solution Ratio, g/L |  | 160 | 105 | 152 |
|---|---|---|---|---|
| Feed Solution, g/L | Cu | 21 | 14 | 15 |
|  | $H_2SO_4$ | 50 | 50 | 50 |
| Leach Liquor, g/L | As | 4.1 | 3.2 | 3.5 |
|  | Cu | 1.2 | 1.2 | <0.001 |
|  | $H_2SO_4$ | 29 | 31 | 19 |
| Leach Residue, % | As | 0.28 | 0.22 | 0.35 |
|  | Cu | 73.1 | 71.1 | 68.6 |
|  | Ni | 0.57 | 0.68 | 2.1 |
|  | S | 22.9 | 22.9 | 23.6 |
| Residue Cu:S Ratio (by mass) |  | 3.2 | 3.1 | 2.9 |

The first two columns illustrate operation under the preferred conditions with a slight excess of soluble copper. The third column illustrates operation with a deficiency of soluble copper.

The process of the present invention provides a number of important advantages. The copper concentrate from the process of the invention is low in iron and arsenic and can be fed directly to the converter stage of a copper smelting process. In contrast, the lower grade concentrates from prior art oxidizing leaches require blending with other low nickel and arsenic content concentrates. Nickel and cobalt are chemically similar to one another and, since mattes treated by the present process may contain cobalt, nickel sulphate produced thereby may contain not only nickel but also cobalt values. The nickel and cobalt may be recovered from the nickel sulphate as refined metals by conventional processes. In addition, copper, gold and PGMs behave chemically similar to one another. Since material treated by the present process may contain either or both of gold and PGMs, copper sulphide residue produced by the process of the invention may contain valuable gold and PGMs. Copper, gold and PGMs may be recovered from the copper sulphide by smelting and refining by conventional processes to electrolytic copper and refined gold and PGMs.

It will be understood that other embodiments and examples of the invention will be readily apparent to a person skilled in the art, the scope of the invention being defined in the appended claims.

The embodiments of the invention in which an exclusive property or privilege is claimed are defined as follows:

1. A process for separating and recovering nickel and copper values from a nickel-copper matte which may contain iron and arsenic which comprises:

leaching granular nickel-copper matte in an acidic solution at a temperature in the range of about 80° to 100° C. under oxidizing conditions at atmospheric pressure with a deficiency of acid to produce a substantially copper-free nickel sulphate solution and a copper-rich sulphide residue also containing a controlled amount of readily acid-soluble copper, leaching the copper-rich sulphide residue in an acidic solution under non-oxidizing conditions under elevated temperature and pressure to produce a final nickel sulphate solution containing an effective amount of soluble copper and an excess of acid to maintain any iron and arsenic in solution while producing a low nickel, copper sulphide product essentially free of iron and arsenic, said product having a Cu:S mass ratio of at least 3:1.

2. A process for separating and recovering nickel and copper values from a nickel-copper matte which may contain iron and arsenic which comprises:

leaching finely divided nickel-copper matte in aqueous sulphuric acid solution under oxidizing conditions at atmospheric pressure with a deficiency of acid and at a minimum temperature of about 80° C. to selectively leach nickel from said matte to produce a nickel sulphate solution having a final pH in the range of about 4.0 to 6.5 and to produce a copper-rich sulphide residue containing readily acid-soluble copper;

separating the copper-rich sulphide residue from the nickel sulphate solution and leaching said residue in a closed reaction vessel at a minimum temperature of about 120° C. under a non-oxidizing atmosphere in a sulphuric acid solution containing an effective amount of acid-soluble copper to provide a terminal concentration of at least about 2 g/L $Cu^{2+}$ to produce a nickel sulphate solution containing any iron and arsenic and to produce a low nickel, copper sulphide product essentially free of said iron and arsenic.

3. A process as claimed in claim 2 in which the low nickel, copper sulphide product has a Cu:S mass ratio of at least 3:1.

4. A process as claimed in claim 2 in which the low nickel, copper sulphide product has a Cu:S ratio in the range of 3:1 to 4:1.

5. A process as claimed in claim 1, in which the copper-rich sulphide residue is leached under a nonoxidizing atmosphere in a sulphuric acid solution containing an effective amount of sulphuric acid to provide a terminal concentration of at least about 20 g/L sulphuric acid.

6. A process as claimed in claim 2 in which the leach under oxidizing conditions is conducted with a deficiency of acid in primary and secondary oxidizing stages, wherein an excess of matte is fed to the primary oxidizing stage and wherein a controlled amount of acid is fed to the second oxidizing stage whereby at least about 5 g/L copper is hydrolyzed to basic copper sulphate.

7. A process as claimed in claim 6 in which the primary stage oxidizing leach is conducted with an excess of matte whereby essentially all copper is precipitated as metallic copper, copper sulphide and basic copper sulphate.

8. A process as claimed in claim 7 in which the oxidizing conditions are produced by sparging the leach solution with at least one of air and oxygen.

9. A process as claimed in claim 8 in which the copper sulphide and basic copper sulphate residue from the leach under oxidizing conditions contains by weight 10–15% sulphur.

10. A process as claimed in claim 7, in which the nickel sulphate solution from the non-oxidizing leach is heated under oxidizing conditions to a temperature of about 150° C. to oxidize any iron to ferric iron and any arsenic to arsenate for precipitation as ferric arsenate, and removing said ferric arsenate precipitate from the nickel sulphate solution.

\* \* \* \* \*